United States Patent [19]

Gregory

[11] 3,779,908
[45] Dec. 18, 1973

[54] COALESCENCE OF WATER AND OLEOPHILIC LIQUID DISPERSIONS BY PASSAGE THROUGH A PERMEABLE, OLEOPHILIC LIQUID EQUILIBRATED, FOAM OF POLYURETHANE

[75] Inventor: Mercer Duane Gregory, Ponca City, Okla.

[73] Assignee: Continental Oil Company, Ponca City, Okla.

[22] Filed: Mar. 19, 1973

[21] Appl. No.: 342,347

Related U.S. Application Data

[63] Continuation of Ser. No. 235,846, March 17, 1972, abandoned.

[52] U.S. Cl............................. 210/23, 210/DIG. 21
[51] Int. Cl............................................ B01d 17/04
[58] Field of Search...................... 210/DIG. 21, 23, 210/307, 500, 510

[56] References Cited
UNITED STATES PATENTS

| 3,617,548 | 11/1971 | Willihagans | 210/23 |
| 3,617,551 | 11/1971 | Johnston et al. | 210/23 |

FOREIGN PATENTS OR APPLICATIONS

| 1,187,605 | 4/1970 | Great Britain | 210/DIG. 21 |

Primary Examiner—Charles N. Hart
Attorney—A. Joe Reinert et al.

[57] ABSTRACT

Dispersions of an oleophilic liquid and water are coalesced by passing through a permeable, non-fibrous, consolidated bed of a polyurethane foam which is equilibrated with respect to sorption of the oleophilic liquid.

5 Claims, No Drawings

COALESCENCE OF WATER AND OLEOPHILIC LIQUID DISPERSIONS BY PASSAGE THROUGH A PERMEABLE, OLEOPHILIC LIQUID EQUILIBRATED, FOAM OF POLYURETHANE

This is a continuation, of application Ser. No. 235,846, filed Mar. 17, 1972 and now abandoned.

BACKGROUND OF THE INVENTION

This invention relates to coalescence of dispersions of oleophilic liquids and water.

Coalescence of dispersions of water and oleophilic liquids is of major importance to industry in the prevention of pollution of the environment and in the conservation of natural resources. Exemplary of a few of the applications are the following: in oil fields, waste waters must have hydrocarbon dispersions removed therefrom prior to surface release; brine or fresh water injection fluid should have hydrocarbon dispersions removed therefrom prior to use in waterflood operations; hydrocarbons should be recovered from brine waste water prior to disposal in underground formations in order to conserve valuable hydrocarbon resources; waste water streams from offshore platforms should have hydrocarbon dispersions removed therefrom before disposal. Streams employed in and released from refineries should or must have oleophilic liquid dispersions removed therefrom. In the wood processing industry, removal of phenolic dispersions from waste waters from creosote treatment is a major problem. In heavy industry, removal of oil from waste waters of aluminum rolling mills, the reclamation of cutting oils, and the removal of oil from brine prior to mineral recovery are important applications. In the metals extraction industry, entrained solvents from raffinate or preg liquor solutions should be recovered. Particularly important applications are evident in marine operations wherein oil should be removed from tanker ballast discharge waters, oil dispersions should be recovered from bilge pump discharge waters, and dispersions should be removed from the separated water discharge from oil spill skimming devices. Many other applications are evident to those skilled in the art, and any process which improves the recovery of oleophilic liquids from dispersions of oleophilic liquids in water is of major importance to industry and the population as a whole in the prevention of environmental pollution and in the conservation of natural resources.

The separation of oleophilic liquids from water wherein the dispersion is of water in the oleophilic liquid is also of major importance. In particular, the removal of dispersions of water in fuels is important to prevent icing during cold weather operation.

Many processes have been developed to remove dispersions of oleophilic liquids from water. However, a major problem still exists, particularly in the petroleum industry, and particularly in the removal of low concentrations of hydrocarbons which are dispersed in water. It is my belief that this invention constitutes a significant breakthrough in the effective and economical separation of dispersions of oleophilic liquids and water.

OBJECTS OF THE INVENTION

One object of the invention is to coalesce dispersions of water and oleophilic liquids.

Another object is to separate dispersions of water and oleophilic liquids by coalescing the dispersions and thence separating the water phase from the oleophilic liquid phase.

SUMMARY OF THE INVENTION

In one aspect, this invention relates to coalescing a dispersion of aqueous liquid and an oleophilic liquid by passing the dispersion through a permeable, non-fibrous, consolidated bed of a synthetic, organic polymer which is equilibrated with respect to sorption of the oleophilic liquid.

In another aspect, this invention relates to coalescing a dispersion of water and an oleophilic liquid by passing the dispersion through a permeable foam of polyurethane which is equilibrated with oleophilic liquid.

In another aspect, the invention relates to a process for separating water and an oleophilic liquid from a dispersion thereof by passing the dispersion through a permeable form of polyurethane which is equilibrated with the oleophilic liquid and then separating the resulting water layer from the resulting oleophilic liquid layer.

DESCRIPTION OF THE PREFERRED EMBODIMENTS

According to the process of this invention, a dispersion of an aqueous liquid and an oleophilic liquid is passed through a permeable, non-fibrous consolidated bed of a synthetic, organic polymer which is equilibrated with respect to sorption of the oleophilic liquid.

More particularly, according to the process of this invention, a dispersion of water and an oleophilic liquid is passed through a permeable foam of polyurethane which is equilibrated with respect to sorption of the oleophilic liquid to coalesce the oleophilic liquid and the water into separate layers which readily separate by gravity. The oleophilic liquid layer and the water layer can then be readily separated from each other.

Dispersions comprised of water and an oleophilc liquid which can be coalesced according to the process of this invention can be either dispersions of oleophilic liquid in water or dispersions of water in oleophilic liquid.

The term oleophilic liquid as employed in this application includes any material which is a liquid at a temperature at which water or an aqueous metallic salt solution can exist in a liquid phase, and which is substantially insoluble in water or an aqueous salt solution. By substantially insoluble is meant less solubility than about 1 part by weight of material per 100 parts by weight of water or aqueous metallic salt solution.

Preferably, the oleophilic liquid is a liquid petroleum hydrocarbon which is a liquid at a temperature in the range of 0° to 100°C. The term "liquid petroleum hydrocarbons" includes natural petroleum products, distillates or fractions thereof, and refined or synthesized products which can be derived from petroleum. Examples of such liquid petroleum hydrocarbons include various crude oils, natural gasolines, condensates, kerosines, gasolines, naphthas, recycle oils, alkylates, fuel oils, benzene, toluene, hexane, bunker oils, lubricating oils, and the like. The process of the invention is presently believed to be particularly applicable to removing dispersions of crude oil from production waters.

The water phase of dispersions which are separated according to the process of the invention can be pure water or can be an aqueous solution or liquid having a soluble metal salt dissolved therein. Examples of some common metal salts which are dissolved in water to form aqueous liquids or solutions and which are commonly encountered include sodium chloride, sodium bromide, magnesium chloride, calcium chloride, sodium sulfate, and the like. Often, such aqueous liquids are derived from natural subterranean brines or from surface waters. There is no limit to the amount of metallic salt which such aqueous solutions contain dissolved therein except the solubility of the particular metallic salts. Usually such aqueous solutions do not contain over about 25 percent by weight of metallic salts.

The permeable, non-fibrous, consolidated bed of a synthetic, organic polymer which is employed according to the process of this invention can be fabricated of any porous solid polymeric organic material having a permeability to water sufficient to allow a practical rate of flow therethrough. What constitutes a practical rate of flow is determined by the economics of each particular situation. The synthetic, organic polymer can be any of a variety of readily available organic polymers such as polyetherurethanes, polyesterurethanes, polycarboxylates, polyurethanes, polyureaformaldehyde, polystyrene, polymeric silicone elastomers, polymers of celluloseacetate, ABS polymers, polymeric diene elastomers, polyphenylene sulfide, polyenes, polyfluorinated hydrocarbon polymers, and the like. The synthetic, organic polymer also encompasses regenerated cellulose. The permeable, non-fibrous consolidated bed of organic polymer of the instant invention is distinguished from a bed of unconsolidated particles, from a bed of consolidated fibers, or a bed of unconsolidated fibers of the organic polymer. The permeable, non-fibrous consolidated beds of the instant invention are preferably open-cell foams, but can include sintered articles and articles wherein particles of organic polymer are consolidated by means of an adhesive. If organic particles are consolidated to form the bed, the greatest dimension of the particles is not more than five times the smallest dimension. In other words, the bed should be fiber free. By consolidated is meant that the bed is comprised of a single integral unit or of integral units which are more than 10 times as great in average dimension as the largest dimension of pores of the bed. Integral units are those which do not deteriorate in structure upon tumbling.

A permeable foam of polyurethane is preferably employed. It can be any open-celled polyurethane foam. *Polyurethanes, Chemistry and Technology*, J. H. Saunders and K. C. Frisch, Volumes I and II, Interscience (1963) and (1964), as well as Kirk Othmer, *Encyclopedia of Chemical Technology*, 2nd Edition, Volume 9, p 853-5 (1966), provide description of many suitable materials and means for preparing them. Permeable polyurethane foams having a density of 0.8 to 7.5 pounds per cubic foot are presently particularly preferred. The polyurethane foam can have a preponderance of either ether linkages or ester linkages or a mixture thereof. Flexible polyurethane foam is presently preferred. Presently, polyurethane foam having a preponderance of ether linkages is particularly preferred. Such polyurethane foams are widely available as items of commerce and can be obtained from any of a number of suppliers.

The process of this invention is particularly applicable for coalescing liquid petroleum hydrocarbons from dispersions of liquid petroleum hydrocarbons in water (or brine). Most satisfactory results are often obtained when such dispersions have in the range of a trace to 1 part by weight of liquid petroleum hydrocarbon per 100 parts by weight of aqueous solution, but dispersions having more than 1 part per 100 can also be satisfactorily separated. Indeed, the process of the invention is applicable for coalescing a dispersion comprising water and an oleophilic liquid wherein the oleophilic liquid comprises any insoluble portion of the dispersion.

According to this invention, the permeable, non-fibrous, consolidated bed of synthetic, organic polymer through which the dispersion is passed must have become so saturated with oleophilic liquid under the particular flowing conditions employed that coalescence has begun. In other words, it must be equilibrated.

The permeable foam of polyurethane through which the dispersion is passed should be equilibrated with respect to the oleophilic liquid in the particular environment that the permeable foam of polyurethane is located. That is, the polyurethane foam should have become so saturated with oleophilic liquid under the particular flowing conditions employed, that coalescence has begun. This critical feature of the instant invention is a major factor in distinguishing it from the prior art of which British Pat. No. 1,210,967 and U.S. Pat. No. 3,617,551 are exemplary. Heretofore, it has been disclosed that dispersions of water and oleophilic liquid have been passed through a material such as polyurethane foam, but it has not been disclosed that such foam has ever reached the point of coalescing the oleophilc liquid. Instead, prior to reaching that point, the material such as polyurethane foam has been subjected to a squeezing step to remove the oleophilic liquid. The instant invention provides a tremendous improvement over such prior art methods in that the squeezing step is eliminated with consequent elimination of expensive and break-down prone mechanical contrivances to accomplish that step. A totally new, advantageous, and unexpected result is effected.

According to a presently preferred mode of operation, temperatures of about 0°–100°C are employed. However, the only requirement with regard to temperature is that both oleophilic liquid and aqueous liquid be in the liquid state. Pressures near atmospheric are preferred because of convenience, though higher or lower pressures can be employed if desired. If gases are dissolved in the oleophilic liquid and/or aqueous phase, pressure sufficient to maintain the gases in solution is preferred. A rate of flow of about 50 to 1000 barrels of dispersion per square foot of bed area per day is presently preferred for most satisfactory results. However, higher or lower rates of flow can be employed if desired.

According to one presently particularly preferred mode of operation, the process of the instant invention is employed to coalesce a dispersion of a liquid petroleum hydrocarbon in water, said dispersion being the aqueous effluent from a conventional API separator, wherein the effluent is polished to a very low level of hydrocarbon in water.

According to one presently preferred mode of operation, a bed of permeable, flexible, polyurethane foam is situated so as to fill a vessel. A dispersion comprising an oleophilic liquid in water (or aqueous solution) is passed upwardly through the bed. Upon equilibration of the polyurethane foam, the oleophilic liquid of the dispersion is coalesced into droplets which then, if less dense than the aqueous liquid, rise to the top of a liquid reservoir situated above the polyurethane foam bed. Thereupon, the oleophilic liquid forms a layer situated above the aqueous layer if the oleophilic liquid is less dense than the aqueous layer. Most oleophilic liquids are less dense than water. Portions of the oleophilic liquid layer and the aqueous liquid layer are continually drawn off, thus effecting separation.

Though a continuous flow upward through a polyurethane foam constitutes one presently preferred mode of operation, the invention is not so limited. The flow of dispersion can be downward through a foam bed or can be in a horizontal direction. The foam can often preferably be employed as a wrapping around a pipe having orifices throughout the region in contact with the foam.

In one presently preferred configuration, the bed of polyurethane foam is separated at intervals by retainers such as screens to maintain the integrity of shape of the polyurethane foam bed. The foam bed can also be compressed if desired when flexible polyurethane foam is employed.

If dissolved gases are present in the oleophilic liquid or aqueous liquid, a sufficient pressure is preferably maintained on the system to keep such gases in solution. Otherwise, gas breaking through the bed has a propensity to cause small oleophilic liquid droplets to prematurely break from the bed. Such droplets of small size are less desirable in that separation into an oleophilic liquid phase and an aqueous phase is less efficient.

To separate some dispersions, it is often highly desirable to employ a polyurethane foam of 2 or more types in layers in the foam bed.

The following examples are presented to more clearly and fully disclose the invention, but should not be construed as limiting the invention in any manner.

EXAMPLE 1

A dispersion of water in oleophilic liquid was prepared by injecting 50 milliliters of 5 weight percent sodium chloride brine ito the intake of a centrifugal pump which was continuously circulating kerosine in a 5-gallon reservoir. A small amount of Tretolite F-46 surfactant (available from Petrolite Corporation, St. Louis, Missouri) was added in producing the dispersion to produce a more stable dispersion. Upon completion of formation of the resulting dispersion, it was allowed to settle for 30 minutes. Thereupon, the water content of the water in oleophilic liquid dispersion was determined to be 1000 ppm.

A flexible, open-cell, polyurethane foam having a density of 1.55 pounds per cubic foot and having a high content of ether linkages in the polyurethane polymer (obtained from The Upjohn Company of Torrance, California)* (The polyurethane foam had a compression set maximum of 10%, a tensile strength of 15 lbs/in.$^2$ minimum, an elongation of 180% minimum, and a resilience of 40% minimum.) was cut into cylinders 3 ½ inches in diameter by 2 inches in thickness. The cylinders were packed into an elongated cylinder of Lucite plastic having an inside diameter of 3 ½ inches and a height of 16 ½ inches to form a foam bed having a depth of 11 ½ inches. The long axis of the coalescer cylinder was vertical. The foam employed in the bed weighed 59.3 grams. A perforated Lucite plastic disk supported the foam bed above a void space of 5 inches. An inlet was provided at the bottom of the coalescer cylinder and an outlet was provided at the top of the coalescer cylinder with a line leading therefrom to a water trap.

Water-kerosine dispersion prepared as specified was pumped through the foam bed in the coalescer at a rate of about 40 ml per hour. This flow rate gave a residence time of about 30 minutes in the foam bed. The effluent from the coalescer was passed to a water trap and the water concentration in the kerosine downstream therefrom was measured after the foam bed had become equilibrated with respect to the oleophilic liquid and coalescence had begun.

The dispersion was at a temperature of about 25°C. The water concentration in the effluent downstream of the water trap was monitored over the period of the run wherein 39 liters of dispersion were passed through the coalescer. The water concentration of the effluent ranged from about 40 to about 100 parts per million. This constituted a reduction of over 90 percent of the water dispersed in the kerosine by passage through the coalescer and the water separator.

This example demonstrates the process of this invention wherein water is coalesced from a dispersion consisting essentially of water in an oleophilic liquid.

EXAMPLE 2

An elongated cylindrical coalescer fabricated of Lucite plastic having an internal diameter of 7.5 inches, having a long axis in a vertical plane, having an inlet at the bottom, having a bed depth of 12 inches of the polyurethane foam of Example 1, having a density of 1.55 pounds per cubic foot thereabove, having a separation reservoir above the polyurethane foam bed, having an aqueous liquid inlet near the bottom of the separation reservoir, and having an oil outlet near the top of the separation reservoir, was set up.

In the South Ponca field of Oklahoma, associated with the production therefrom, is a dispersion of South Ponca crude oil (43° API gravity) in water having a temperature of 90°F and having an oil concentration ranging from about 100–200 parts per million therein.

The oil in water dispersion of the South Ponca field was passed to the coalescer and thence upward through the foam bed. After sufficient of the dispersion had passed through the foam bed to equilibrate the polyurethane foam, coalescence was initiated. Continued upward passage of the dispersion, coalescence thereby, and separation of the oil, which was drawn from the top of the separation reservoir, and water which was drawn from the center of the separation reservoir situated above the foam bed effected separation into oil and water components.

The following table presents data for the run wherein the oil was coalesced from the oil in water dispersion.

TABLE I

| Flow rate bbl/day, ft.$^2$ of foam surface | Press. drop across the bed $\Delta P$ (psi) | Influent oil conc. (ppm) of dispersion | Effluent oil conc. (ppm) of aqueous phase | Total hrs. operated |
|---|---|---|---|---|
| 229 | 2.0 | 116 | 1.8 | 1 |
| 229 | 2.0 | 120 | 1.8 | 2½ |
| 229 | 2.0 | 174 | 2.0 | 3½ |
| 229 | 2.0 | 126 | 1.5 | 4½ |
| 229 | 2.0 | 113 | 1.2 | 5 |
| 229 | 2.0 | 180 | 1.3 | 6 |
| 229 | 2.7 | (*) | 1.2 | 6¾ |
| 229 | (*) | 194 | 1.3 | 7¾ |
| (*) | (*) | (*) | 1.1 | 8¾ |
| (*) | 4.0 | 214 | 2.4 | 9¼ |

* Data not taken.

This example demonstrates the effective coalescence of crude oil from a crude oil in water dispersion according to the process of this invention.

EXAMPLE 3

The run of Example 2 was repeated except that the foam bed employed in Example 2 was replaced with two 2-inch beds of the 1.55 pound per cubic foot polyether-based polyurethane foam of Example 1, which were separated and retained by retainers. The following data were obtained:

TABLE II

| Flow rate bbl/day, ft.$^2$ of foam surface | Press. drop across the bed $\Delta P$ (psi) | Influent oil conc. (ppm) of dispersion | Effluent oil conc. (ppm) of aqueous phase | Total hrs. operated |
|---|---|---|---|---|
| 229 | 2.0 | 164 | 11.4 | 2½ |
| 235 | 2.0 | (*) | 11.2 | 3½ |
| 262 | 2.3 | (*) | 7.6 | 4½ |
| 242 | 2.3 | (*) | 4.8 | 5½ |
| 252 | 2.7 | (*) | 4.9 | 6½ |
| 271 | 2.7 | (*) | 4.6 | 7½ |
| 235 | 2.6 | 142 | 5.2 | 8½ |
| 235 | 3.0 | (*) | 5.2 | 9½ |
| 262 | 2.7 | (*) | 5.6 | 10½ |
| 235 | 2.7 | (*) | 5.2 | 11½ |
| 229 | 2.7 | (*) | 7.0 | 12½ |

* Data not taken.

This example again demonstrates coalescence of crude oil from a dispersion comprised of crude oil in water. Though the effluent water is not quite as well purified as in Example 2, very good coalescence and subsequent separation is in fact effected.

EXAMPLE 4

The run of Example 2 was repeated except that the foam bed of Example 2 was replaced with two foam beds which were each 2 inches thick, separated and retained in place by retainers. The foam used in the run of this example was a 7.5 pound per cubic foot polyether-based polyurethane foam obtained from The Upjohn Company. The following data were obtained:

TABLE III

| Flow rate bbl/day, ft.$^2$ of foam surface | Press. drop across the bed $\Delta P$ (psi) | Influent oil conc. (ppm) of dispersion | Effluent oil conc. (ppm) of aqueous phase | Total hrs. operated |
|---|---|---|---|---|
| 235 | 3.4 | 159 | 4.0 | 1½ |
| 229 | 3.7 | (*) | 4.9 | 2½ |
| 229 | 3.8 | (*) | 5.6 | 3½ |
| 229 | 4.2 | 201.6 | 13.8 | 5¼ |
| 229 | 4.5 | (*) | 2.9 | 6¼ |
| 229 | 4.8 | (*) | 2.9 | 7¼ |

* Data not taken.

This example again demonstrates superior coalescence of crude oil from a crude oil in water dispersion according to the process of this invention. However, in this case, a different density and grade of polyurethane foam were employed.

EXAMPLE 5

The run of Example 2 was repeated except that the foam bed of Example 2 was replaced with a foam bed comprising an upper layer which was 2 inches thick of 1.55 pounds per cubic inch polyether-based polyurethane foam and a lower layer of 1.55 pounds per cubic foot polyether-based polyurethane foam which was 2 inches thick originally but compressed by retainers to a thickness of 1.25 inches. The layers of the foam bed were separated and retained in place by retainers. The following results were obtained.

TABLE IV

| Flow rate bbl/day, ft.$^2$ of foam surface | Press. drop across the bed $\Delta P$ (psi) | Influent oil conc. (ppm) of dispersion | Effluent oil conc. (ppm) of aqueous phase | Total hrs. operated |
|---|---|---|---|---|
| 229 | 2.2 | 204 | 7.7 | 1 |
| 229 | 2.2 | (*) | 12.0 | 1¾ |
| 229 | 2.5 | (*) | 6.1 | 2¾ |
| 229 | 2.2 | (*) | 5.8 | 3¾ |
| 229 | 2.7 | 134 | 2.8 | 4½ |
| 229 | 2.7 | (*) | 2.6 | 5½ |
| 235 | 2.6 | (*) | 5.4 | 6½ |
| 229 | 2.7 | (*) | 3.8 | 7 |
| 229 | 2.7 | (*) | 4.9 | 8 |
| 223 | 2.7 | (*) | 3.8 | 9 |
| 253 | 3.0 | 134 | 3.4 | 10 |
| 242 | 3.3 | (*) | 3.2 | 11 |
| 223 | 3.3 | (*) | 11.7 | 12 |

* Data not taken.

This example again demonstrates the superior coalescence and separation of crude oil from a crude oil in water dispersion according to the process of this invention. Different conditions of operation are demonstrated.

EXAMPLE 6

The run of Example 2 was repeated except that the bed of polyurethane foam employed in Example 2 was replaced with a bed 3.5 inches deep of a polyester-based polyurethane foam having a density of 6.0 pounds per cubic foot.* (*The polyurethane foam had a maximum compression set of 10%, a minimum tensile strength of 15 lbs/in.$^2$, a minimum elongation of 150%, and a minimum resilience of 20%.) Also, the dispersion of petroleum in water employed in Example 2 was replaced with a dispersion comprised of about 100–200 parts per million of Grand Isle crude oil from the CAGC Shore Terminal in Grand Isle, Louisiana, at a temperature of about 75°F in 5 percent NaCl brine. The following data were obtained:

TABLE V

| Flow Rate, Bbl/day, ft.$^2$ of Foam Surface ~70 | Influent Oil Conc. (ppm) of Dispersion | Effluent Oil Conc. (ppm) of Aqueous Phase |
|---|---|---|
| | 200 | 66 |
| | 200 | 124 |
| | 104 | 37 |
| | 83 | 28 |

This example demonstrates coalescence and subsequent separation of another crude oil from a dispersion consisting essentially of crude oil in aqueous liquid. Effectiveness of another type of permeable flexible polyurethane foam having another density is also demonstrated.

EXAMPLE VII

The run of Example 6 was repeated except that the bed of polyurethane foam employed therein was replaced with a bed 3.5 inches thick of a polyether-based polyurethane foam having a density of 7.5 pounds per cubic foot. The results obtained are presented in the following table.

TABLE VI

| Flow Rate, Bbl/day, ft.² of Foam Surface | Influent Oil Conc. (ppm) of Dispersion | Effluent Oil Conc. (ppm) of Aqueous Phase |
|---|---|---|
| 300 | 47 | 5 |
| 164 | 114 | 5 |
| 47 | ~200 | 4 |

This example further demonstrates the effectiveness of another grade of polyurethane foam.

EXAMPLE 8

The run of Example 6 was repeated except that the bed of polyurethane foam employed therein was replaced with a bed 3.5 inches thick of 2.0 pounds per cubic foot polyester-based polyurethane foam.* (*This polyester-based polyurethane foam had a 10% maximum compression set, a 20 Lbs/in.² minimum tensile strength, a 300% minimum elongation, and a 20% minimum resilience.) Also, as noted in the following table, the Grand Isle crude oil in water dispersion was replaced with a dispersion of South Ponca Crude oil in water in the latter part of the run.

TABLE VII

| Flow Rate, Bbl/Day, Ft.² of Foam Surface | Influent Oil Conc. (ppm) of Dispersion | Effluent Oil Conc. (ppm) of Aqueous Phase |
|---|---|---|
| 84 | 78 | 13.8 |
|  | 222 | 10.6 |
|  | 130 | 15.3 |
|  | 120 | 6.7 |
|  | 120 | 14.2 |
|  | 112 | 7.6 |
|  | 120 | 8.4 |
|  | 133 | 10.3 |
|  | 188 | 17.2 |
|  | 242 | 14.4 |
|  | 349 | 15 |
| 300 | 132 | 11.2 |
| 282 | 127 | 29 |

(Grand Isle Crude; S. Ponca Mississippi Chat Crude, API Gravity 43)

This example further demonstrates the use of flexible polyurethane foams for the coalescence of dispersions of oleophilic liquid in aqueous liquid.

EXAMPLE 9

The run of Example 2 was repeated except that the foam bed employed in Example 2 was replaced with a bed of polyester-based polyurethane foam having a commercial designation of Presto-Foam 945, having a depth of 4 inches and a density of 4.5 pounds per cubic foot. This foam was obtained from the Presto Manufacturing Company, Inc., 2 Franklin Avenue, Brooklyn, New York 11211. Data which were obtained are presented in the following table:

TABLE VIII

| Flow Rate, Bbl/Day. Ft.² of Foam Surface | Influent Oil Conc. (ppm) of Dispersion | Effluent Oil Conc. (ppm) of Aqueous Phase |
|---|---|---|
| 111 | 486 | 10 |
| 112 | 387 | 14.6 |
| 112 | 472 | 15 |
| 113 | 240 | 23 |
| 112 | 195 | 15 |
| 112 | 267 | 16 |

This example demonstrates the process of the invention with yet another commercial polyurethane foam.

EXAMPLE 10

A flexible, cellulose sponge having an open cell structure (obtained from the DuPont Company) was cut into a 2 ½ inch diameter cylinder and placed to a depth of 2 inches into a cylinder having an internal diameter of 2 ½ inches. The long axis of the cylinder was vertical. The arrangement of the coalescer was as in Example 2. The weight of the foam was 12.84 g and the effective density was 5.0 pounds per cubic foot.

A dispersion of Southeast Eureka crude oil in 5 percent NaCl brine was prepared and passed upwardly through the foam of regenerated cellulose until equilibrated. The following data were obtained.

TABLE IX

| Flow Rate, Bbl/Day, Ft.² of Foam Surface | Influent Oil Conc. (ppm) of Dispersion | Effluent Oil Conc. (ppm) of Aqueous Phase |
|---|---|---|
| 62 | 300 | 52 |
| 62 | 276 | 38 |
| 62 | 240 | 24 |

This example demonstrates that a permeable, cellular regenerated cellulose foam is effective to coalesce dispersions of an oleophilic liquid and water.

I claim:

1. In a process for coalescing and separating a dispersion comprised of water and a liquid petroleum hydrocarbon, the dispersion being more readily separable by gravity following coalescence than before, wherein the process comprises passing the dispersion through a bed of a permeable, coalescing material which is sufficiently saturated with liquid petroleum hydrocarbon that coalescence has begun, in intimate contact with the permeable, coalescing material at a rate of flow sufficiently low to effect a coalescence of the dispersed phase, permitting the thus coalesced mixture to separate into a liquid petroleum hydrocarbon layer and a water layer, and withdrawing the separate layers; the improvement comprising:
   employing a permeable foam of polyurethane as the permeable coalescing material,
   wherein the permeable foam of polyurethane is a flexible foam,
   wherein a flow rate of about 50 to 1000 barrels of the dispersion per square foot of bed area per day is employed,
   wherein the permeable foam of polyurethane has a density of about 0.8 to 7.5 pounds per cubic foot,
   wherein the operating temperature is about 0°C to about 100°C, and
   wherein a pressure sufficient to substantially completely maintain the liquid petroleum hydrocarbon which is coalesced in the liquid state is employed.

2. The improvement of claim 1 wherein the dispersion is a dispersion of a liquid petroleum hydrocarbon in water, wherein the liquid petroleum hydrocarbon dispersed phase comprises a trace to about 1 part by weight of liquid petroleum hydrocarbon per 100 parts by weight of water, and wherein the coalesced liquid petroleum hydrocarbon is separated from the water by gravity separation subsequent to coalescence.

3. The improvement of claim 2 wherein the liquid petroleum hydrocarbon is a crude oil, and the dispersion is the aqueous effluent from a conventional API separator.

4. The improvement of claim 2 wherein the liquid petroleum hydrocarbon is a crude oil, wherein the dispersion contains about 50 to about 350 ppm of crude oil, and wherein the depth of the polyurethane foam bed is about 3.5 to about 12 inches.

5. The improvement of claim 1, wherein the dispersion is a dispersion of water in a liquid petroleum hydrocarbon.

* * * * *